(12) United States Patent
Maeda et al.

(10) Patent No.: US 6,778,935 B2
(45) Date of Patent: Aug. 17, 2004

(54) MONITOR DEVICE, BASE DEVICE AND INFORMATION TERMINAL DEVICE

(75) Inventors: Satoru Maeda, Kanagawa (JP); Tomoya Oguni, Iwate (JP); Katsutoshi Sakao, Kanagawa (JP); Kiyotada Yokogi, Tokyo (JP); Noriyuki Uchiumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/182,476
(22) PCT Filed: Nov. 29, 2001
(86) PCT No.: PCT/JP01/10427
§ 371 (c)(1), (2), (4) Date: Jul. 29, 2002
(87) PCT Pub. No.: WO02/45418
PCT Pub. Date: Jun. 6, 2002

(65) Prior Publication Data
US 2003/0004690 A1 Jan. 2, 2003

(30) Foreign Application Priority Data
Nov. 30, 2000 (JP) ........................................ 2000-366127
Nov. 30, 2000 (JP) ........................................ 2000-366128

(51) Int. Cl.$^7$ .............................................. G06F 15/00
(52) U.S. Cl. ..................................................... 702/127
(58) Field of Search ........................ 702/127; 358/494; 348/187, 244, 372, 148; 430/48; 204/298; 399/1, 310, 90; 273/121; 345/100; 396/613, 429; 298/187.1; 393/620; 359/630

(56) References Cited

U.S. PATENT DOCUMENTS 5,940,647 A * 8/1999 Abe ............................ 396/429
6,369,952 B1 * 4/2002 Rallison et al. ............. 359/630
6,407,829 B1 * 6/2002 Nakamura .................. 358/494

FOREIGN PATENT DOCUMENTS

| JP | 53-166819 | 6/1978 | |
| JP | 61-27285 | 2/1986 | |
| JP | 9-121317 | 5/1997 | |
| JP | 09-121317 | * 5/1997 | ............ H04N/5/64 |

* cited by examiner

Primary Examiner—John Barlow
Assistant Examiner—Tung Lau
(74) Attorney, Agent, or Firm—Frommer Lawrence & Haug LLP; William S. Frommer; Leonard J. Santisi (57) ABSTRACT

The present invention provides a system composed of a monitor unit including a display and being driven by a battery and a base unit for transmitting image information to the monitor unit, which system is capable of charging the battery for driving the monitor unit without the need of provision of any special charging unit. The monitor unit has a configuration that a battery is mounted on a back surface portion and a stand is contained in the back surface portion, and also a groove portion is formed in a bottom surface and a charge terminal is provided in the groove portion. The base unit has a configuration that a holding rail is formed in a lower portion of a front surface portion and a charge terminal is provided on the holding rail. In the case of charging the battery, the monitor unit is stood against the front surface portion of the base unit in such a manner that the stand is contained in the stand containing groove portion and the holding rail of the base unit is inserted in the groove portion of the bottom surface of the monitor unit. A rib for pressing the battery onto the battery mounting portion located on one end side of the battery containing groove portion is formed on the back surface of the battery cover.

12 Claims, 8 Drawing Sheets

MONITOR DEVICE, BASE DEVICE AND INFORMATION TERMINAL DEVICE

TECHNICAL FIELD

The present invention relates to a monitor unit including a display such as an LCD (Liquid Crystal Display) and being driven by a battery, a base unit for transmitting image information to the monitor unit, and an information terminal unit including a display such as an LCD and being driven by a battery.

BACKGROUND ART

The present applicant has proposed, as one kind of radio LAN (Local Area Network) organized in a limited area such as in a house, a system composed of a base unit and a monitor unit, wherein the base unit functions as an information source, for example, by a configuration that a tuner for receiving television broadcasting is contained or connected in or to the base unit and a telephone line is connected to the base unit via a modem; and a monitor unit is configured to transmit a command to the base unit by radio communication between the base unit and the monitor unit, receive information such as an image and a voice from a television or an image from the Internet, and display the image on a display while output the voice from a speaker or a headphone.

Figure 8:
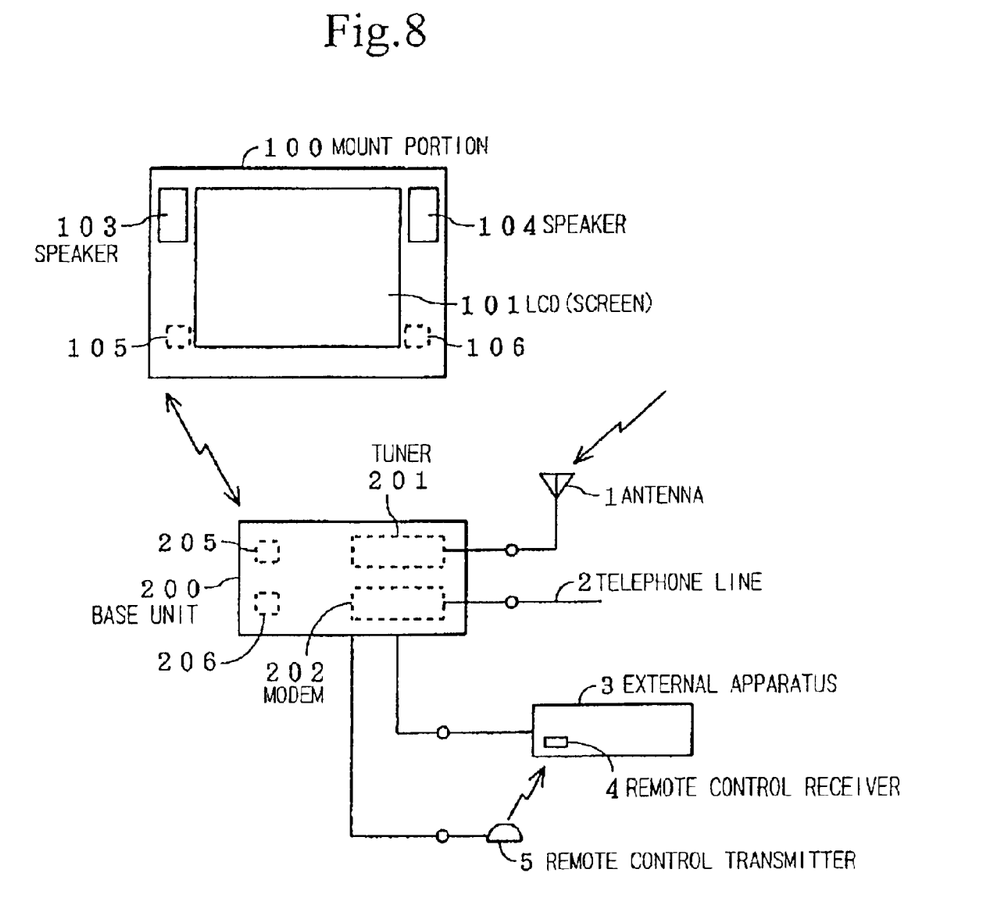
FIG. 8 is a view showing one example of the system composed of the monitor unit and the base unit.

FIG. 8 shows one example of this system, in which a monitor unit 100 is provided with an LCD 101, speakers 103 and 104, and so-called patch antennas 105 and 106 for radio communication between a base unit 200 and the monitor unit 100.

The base unit 200 is provided with a tuner 201 for receiving television broadcasting, a modem 202, and so-called patch antennas 205 and 206 for radio communication between the monitor unit 100 and the base unit 200. The tuner 201 is connected to an antenna 1 for receiving television broadcasting, and the modem 202 is connected to a telephone line 2, so that the monitor unit 100 receives television broadcasting by radio communication between the base unit 200 and the monitor unit 100, and accesses the Internet to transmit and receive e-mails.

An external apparatus 3 such as a video deck, a DVD player, or a tuner for receiving digital CS broadcasting or BS digital broadcasting can be connected to the base unit 200, and the monitor 100 can receive image information or audio information obtained from the external apparatus 3 by radio communication between the base unit 200 and the monitor unit 100. A remote control transmitter 5 such as an AV mouse can be connected to the base unit 200. In this case, remote control signal light transmitted from the remote control transmitter 5 is received by a remote control receiver 4 provided on the external apparatus 3, so that the external apparatus 3 can be controlled by the monitor unit 100.

According to the above-described system, a user can fixedly dispose the base unit 200 at a location in a living room or the like and carry the monitor unit 100 to an arbitrary location in a house or a garden, and at the arbitrary location, the user can achieve various functions of, for example, receiving television broadcasting, and accessing the Internet to transmit or receive e-mails, by using the monitor 100 located within reach.

In the above-described system, the monitor unit 100 is driven by a battery. In this case, however, it becomes a key issue how to charge the battery. The battery can be charged by using a special charging unit; however, in this case, there occurs a problem that the number of units constituting the entire system is increased, to raise the cost of the entire system, and also there occurs an inconvenience that the monitor unit 100 is not available, and more concretely, the monitor unit 100 does not allow a user to view an image at the time of charging using the special charging unit.

Accordingly, a first object of the present invention is to provide a system composed of the above-described monitor unit and base unit, wherein a battery for driving the monitor unit can be charged without the need of provision of any special charging unit other than the monitor unit and base unit, and the monitor unit is kept available even at the time of charging, just like the monitor unit at the time of non-charging.

Like the above-described monitor unit, various kinds of information terminal units of a type including a display such as an LCD and being driven by a battery, such as a portable telephone, have been developed and commercially available. In such an information terminal unit, a mechanism of mounting and holding a battery has been often configured by inserting the battery in a battery containing portion from one side surface of the unit and mounting a cover onto the battery containing portion.

To realize an information terminal unit having various functions, however, it is required to provide various knobs and terminals even on a side surface portion of the unit. For example, in an information terminal unit including a display, speakers, and various operating keys on a front surface portion, it has been required to provide, on a side surface portion, a terminal connected to a headphone, a slot in which a memory (recording medium) such as "Memory Stick" (registered tradename by the present applicant), and a jog dial for performing various operations.

In this case, it may be preferable or required to adopt a structure that a battery containing portion be provided on a back surface portion of the unit, for example, at a central portion in place of the conventional structure that a battery is inserted in a battery containing portion from one side surface of the unit. To realize such a structure, it becomes a key issue how to mount and hold a battery in the battery containing portion in the back surface portion of the unit.

Accordingly, a second object of the present invention is to provide an information terminal unit including a display on a front surface portion and being driven by a battery, wherein in the case of containing the battery in a back surface portion of the unit, the battery can be certainly mounted and held in a battery containing portion provided in the back surface portion of the unit.

DISCLOSURE OF INVENTION

According to the present invention, there is provided a monitor unit, in which a display is provided on a front surface portion and a battery is mounted in a back surface portion or another portion, characterized in that a groove portion, in which a holding rail provided on a bottom portion of a front surface portion of a base unit for transmitting image information to the monitor unit is to be inserted, is formed in a bottom surface of the monitor unit; and a charge terminal to be connected to a charge terminal provided on the holding rail of the base unit is provided in the groove portion of the monitor unit.

According to the present invention, there is also provided a base unit for transmitting image information to a monitor unit, the monitor unit including a display provided on a front surface portion and a battery mounted on a back surface portion or another portion, characterized in that a holding rail to be inserted in a groove portion formed in a bottom surface of the monitor unit is provided on a bottom portion of a front surface portion of the base unit; and a charge terminal to be connected to a charge terminal provided in the groove portion of the monitor unit is provided on the holding rail With this configuration, a battery for driving the monitor unit can be charged without the need of provision of any special charging unit other than the monitor unit and the base unit, and the monitor unit is kept available even at the time of charging, just like the monitor unit at the time of non-charging.

According to the present invention, there is also provided an information terminal unit including a display on a front surface portion and being driven by a battery, characterized in that a battery containing groove portion is formed in a back surface portion and a battery mounting portion is provided on one end side of the battery containing groove portion; a battery cover is provided so as to be mounted in the battery containing groove portion in a state in which a battery has been inserted in the battery containing groove portion from a rear side of the back surface portion, being slid in the battery containing groove portion in a direction parallel to a screen of the display, and mounted in the battery mounting portion; and a rib for pressing the battery on the battery mounting portion side is formed on a back surface of the battery cover.

With this configuration, a battery can be certainly mounted and held in the battery containing portion provided in the back surface portion of the information terminal unit with a simple structure.

BRIEF DESCRIPTION OF DRAWINGS

FIGS. 1, 2, 3 and 4 show one embodiment of a monitor unit (or information terminal unit) of the present invention, wherein

FIGS. 5 and 6 show one embodiment of a base unit of the present invention, wherein

FIGS. 7(A) and 7(B) show an operational configuration of a system composed of the embodiment of the monitor unit and the embodiment of the base unit according to the present invention, wherein

BEST MODE FOR CARRYING OUT THE INVENTION

Hereinafter, the best mode for carrying out the present invention will be described with reference to the drawings.

It is to be noted that a monitor unit of the present invention and an information terminal unit of the present invention has a common configuration including a display disposed on a front surface portion and being driven by a battery, and therefore, an embodiment of the monitor unit of the present invention and an embodiment of the information terminal unit of the present invention will be described as a common embodiment.

[Embodiment of Monitor Unit (or Information Terminal Unit)]

As shown in FIG. 1, a monitor unit 100 has an integral structure that a front surface portion 110 and a back surface portion 150 are stuck to each other. An LCD 101 is provided on the front surface portion 110. A touch panel 102 is provided on a screen of the LCD 101. On left side and right side of the screen of the LCD 101, speakers 103 and 104 are provided on an upper position, and on a lower position, so-called patch antennas 105 and 106 are provided for radio communication between a base unit 200 to be described later with reference to FIGS. 5 and 6.

Figure 1A:
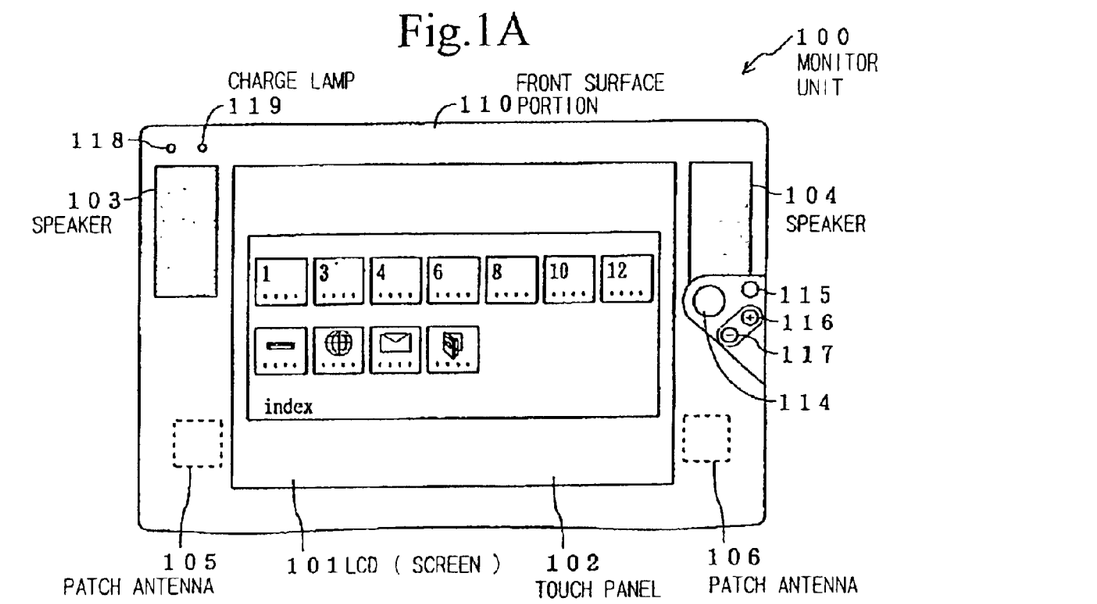
FIG. 1(A) is a front view of the monitor unit.

One patch antenna 105 forms a hemispherical surface shaped radiation pattern on a front side of the front surface portion 110, and the other patch antenna 106 forms a hemispherical surface shaped radiation pattern on a rear side of the front surface portion 110. By selecting either of the patch antennas 105 and 106 for actually transmitting/receiving signals on the basis of signal reception level information of each of the patch antennas, the patch antennas 105 and 106 form an antenna having a full-spherical surface shaped radiation pattern as a whole, to desirably perform radio communication between the monitor unit 100 and the base unit 200 irrespective of a positional relationship between the monitor unit 100 and the base unit 200.

On a right side portion of the front surface portion 110, an index button 114, a jump button 115, and channel buttons 116 and 117 are provided on a lower side of the speaker 104, and on a left side portion of the front surface portion 110, a mail automatic transmitting/receiving lamp (LED) 118 and a charge lamp (LED) 119 are provided on an upper side of the speaker 103.

When the index button 114 is depressed, an index screen as shown in the figure is displayed on the LCD 101. By touching either of menus with a touch pen, a user can perform either of tuning of television, operation of an external apparatus connected to the base unit 200, access to the Internet, preparation and transmission of a mail, and preparation and display of an album to be described later.

When the jump button 115 is depressed, a received channel before last can be received. When the channel button 116 is depressed, an operational screen to be displayed on the LCD 101 can be switched in the order of television→external apparatus→Internet→mail→album→elevision. When the channel button 117 is depressed, the operational screen to be displayed on the LCD 101 can be switched in the order reversed to that described above.

The album means that still images photographed by a digital camera or the like and recorded in "Memory Stick" (registered tradename by the applicant) or still images received by e-mail are incorporated and stored in the monitor unit 100, and are displayed as a list or on a large scale, or attached to an e-mail prepared on the LCD 101.

Figure 1B:
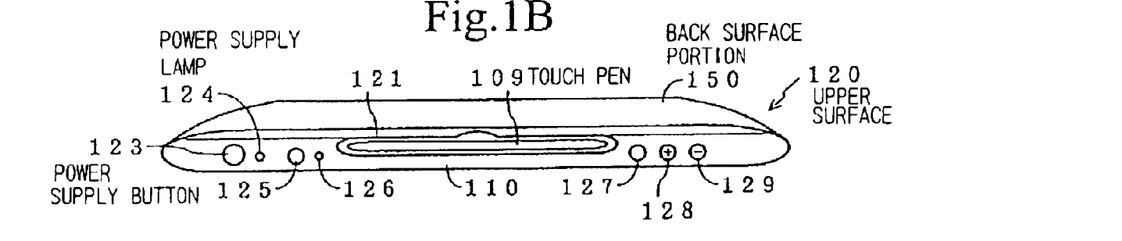
FIG. 1(B) is a top view of the monitor unit.

A groove portion 121 in which a touch pen 109 is contained, a power supply button 123, a power supply lamp (LED) 124, a line disconnection button 125, a line lamp (LED) 126, a mute button 127, a sound volume increasing button 128, and a sound volume reducing button 129 are provided on an upper surface 120 of the monitor unit 100.

Figure 1C:
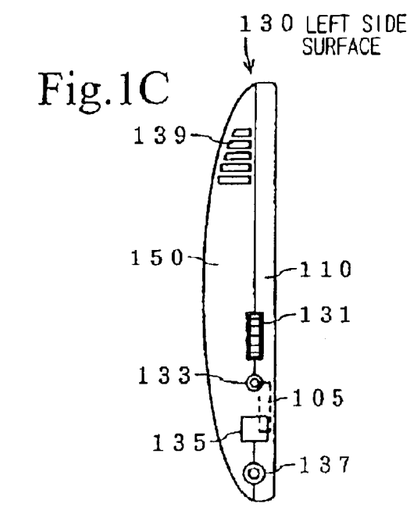
FIG. 1(C) is a left side view of the monitor unit.
Figure 1D:
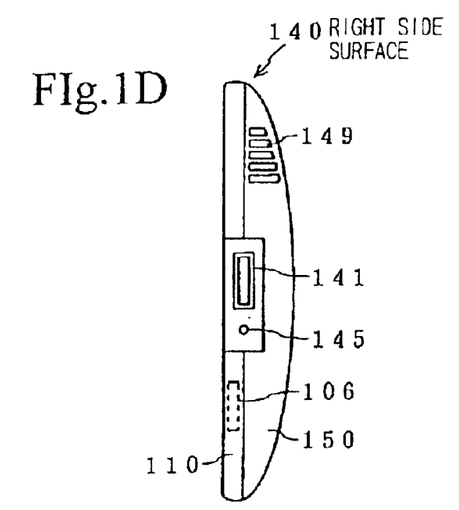
FIG. 1(D) is a right side view of the monitor unit.

A knob 131 for adjusting the brightness of the LCD 101, a terminal 133 to which a headphone is to be connected, an openable/closable cover 135 for covering a terminal to which a key board is to be connected, a terminal 137 to which an AC power adapter for the monitor unit 100 is to be connected, and a vent hole 139 are provided on or in a left side surface 130 of the monitor unit 100, and a slot 141 to which the above-described medium "Memory Stick" is to be mounted, a lamp (LED) 145 for the medium "Memory Stick", and a vent hole 149 are provided on or in a right side surface 140 of the monitor unit 100.

Figure 2A:
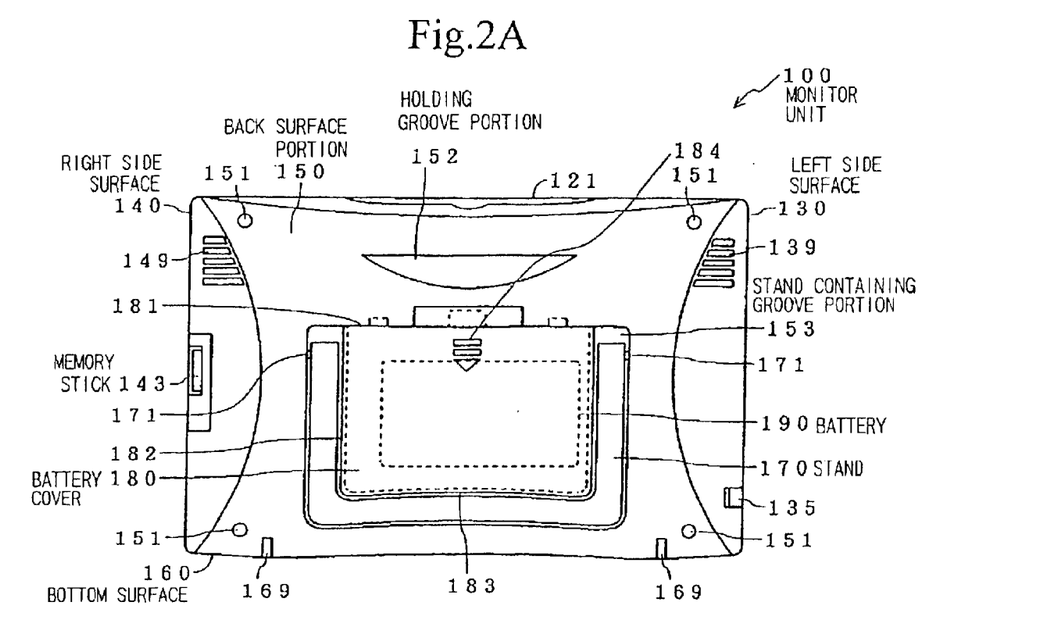
FIG. 2(A) is a back view of the monitor unit and FIG. 2(B) is a bottom view of the monitor unit.
Figure 2B:
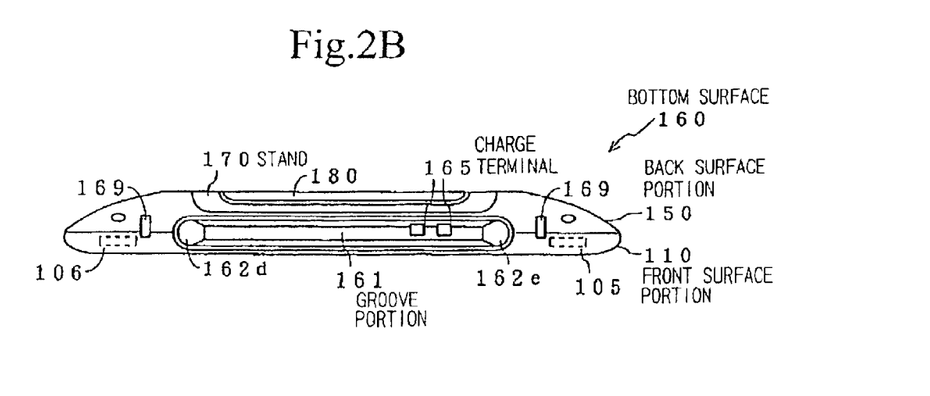

FIG. 2(A) shows a state in which the medium "Memory Stick", designated by reference numeral 143, is mounted in the slot 141 shown in FIG. 1(D). As shown in FIGS. 2(A) and 2(B), the front surface portion 110 is joined to the back surface portion 150 by means of screws 151.

A holding groove portion 152 is formed in an upper portion of the back surface portion 150. A user can easily carry the monitor unit 100 by holding the monitor unit 100 with his or her fingers inserted in the holding groove portion 152.

A stand containing groove portion 153 is formed at a position under the holding groove portion 152. A stand 170 is mounted in the stand containing groove portion 153 in such a manner as to be openable/closable (turnable) around a shaft 171.

A battery containing groove portion (which will be described later) is formed in the back surface portion 150 at a position surrounded by the stand containing groove portion 153. A battery 190 is mounted in the battery containing groove portion, and a battery cover 180 is mounted in the stand containing groove portion 153.

A groove portion 161 is formed in a bottom portion of both the front surface portion 110 and the back surface portion 150, that is, a bottom surface 160 of the monitor unit 100. With respect to the groove portion 161, as will be described later with reference to FIG. 7(B), when the monitor unit 100 is stood against the base unit 200, a holding rail 212 of the base unit 200 is inserted in the groove portion 161. Left and right planes 162d and 162e of the groove portion 161 are tilted in such a manner that positions of the left and right planes 162d and 162e come closer to a bottom surface of the groove portion 161, a gap therebetween becomes narrower. A pair of charge terminals 165 are provided in such a manner as to extend from the bottom surface to a rear surface of the groove portion 161.

On the bottom surface 160 of the monitor unit 100, antislipping bodies 169 made from rubber or the like are mounted on left and right sides of the groove portion 161 in order to prevent the monitor unit 100 from being slipped when the monitor unit 100 is made to self-stand with the stand 170 opened as will be described with reference to FIG. 7(A).

Figure 3A:
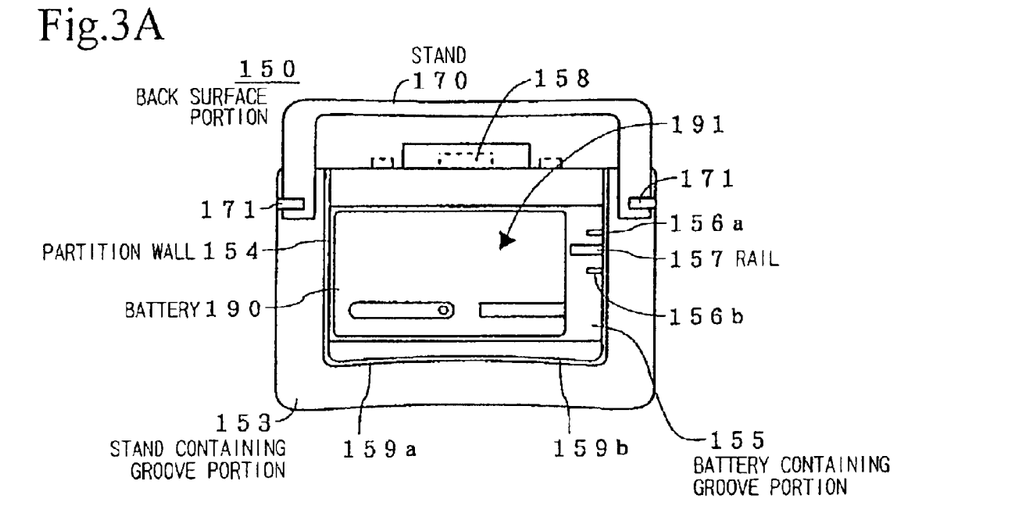
FIG. 3(A) is a plan view of a back surface portion of the monitor unit showing a state in which a battery is inserted in a battery containing groove portion.
Figure 3B:
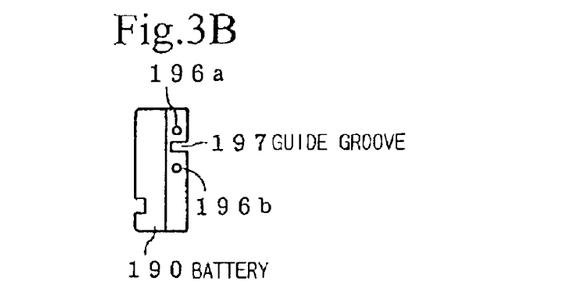
FIG. 3(B) is a right side view of the battery.
Figure 3C:
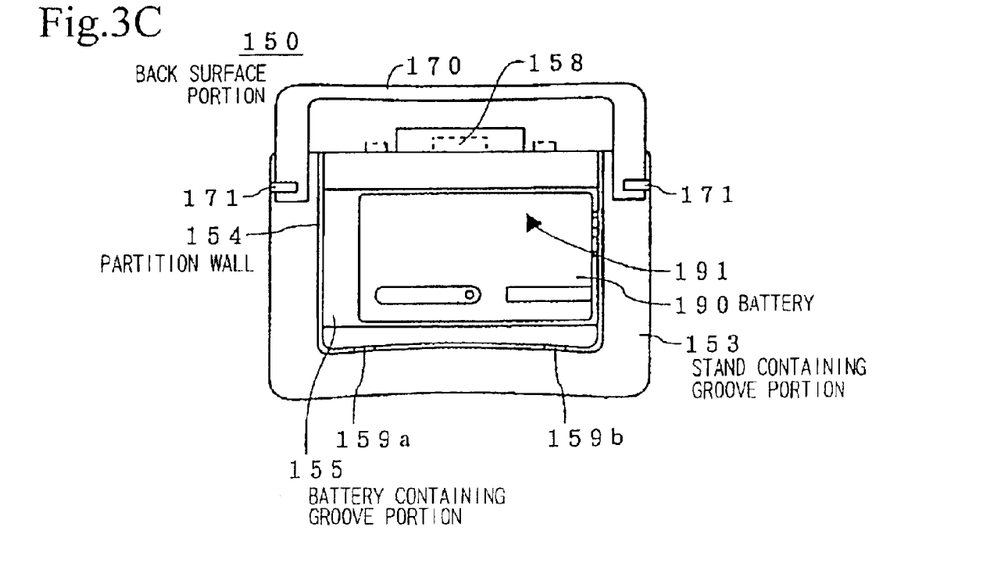
FIG. 3(C) is a plan view of the back surface portion of the monitor unit showing a state in which the battery is mounted in the battery containing groove portion.

FIGS. 3(A) to 3(C) show a state in which the stand 170 on the back surface portion 150 side is opened, and the battery cover 180 shown in FIGS. 2(A) and 2(B) is removed from the stand containing groove portion 153. As shown in FIGS. 3(A) to 3(C), a battery containing groove portion 155 is formed inside the stand containing groove portion 153 of the back surface portion 150 in such a manner as to be separated from the stand containing groove portion 153 by means of a partition wall 154 put therebetween. Connection terminals 156a and 156b are provided and also a rail 157 are formed on a right side portion of the battery containing groove portion 155. An engagement groove portion 158 is formed in an upper wall surface of the battery containing groove portion 155, and holes 159a and 159b are formed in a lower portion of the partition wall 154.

A mark 191 indicating a mounting direction of the battery 190 is formed on a front surface of the battery 190. Holes 196a and 196b in which connection terminals are provided respectively are formed in a right side surface of the battery 190, and a guide groove 197 is formed in a back surface of the battery 190 in such a manner as to be opened to the right side surface of the battery 190.

Figure 4A:
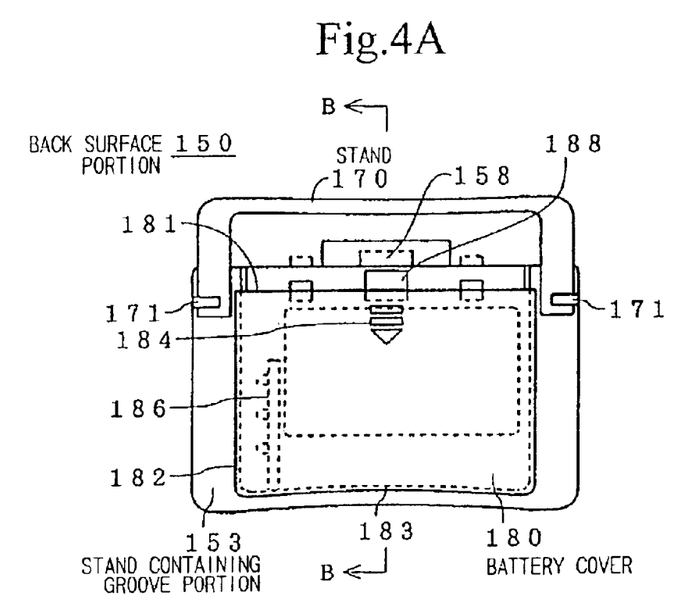
FIG. 4(A) is a plan view of the back surface portion of the monitor unit showing a state in which a battery cover is mounted in a stand containing groove portion (or removed from the stand containing groove portion)
Figure 4B:
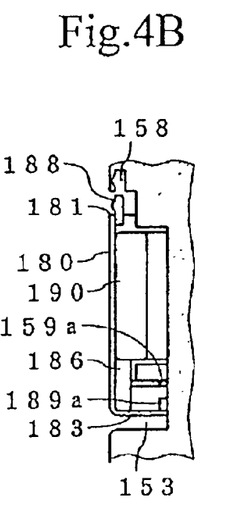
FIG. 4(B) is a sectional view taken on line B—B of FIG. 4(A)
Figure 4C:
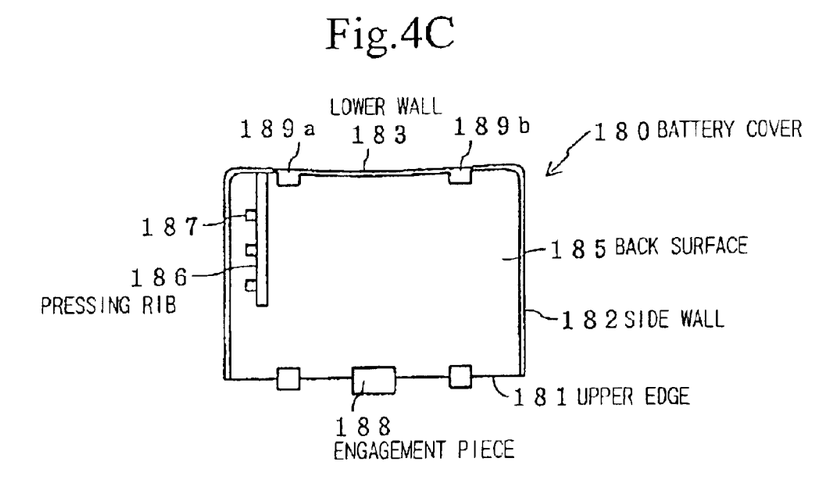
FIG. 4(C) is a plan view of the battery cover, as seen from the back surface side.

As shown in FIGS. 4(A) to 4(C), side portions and a lower portion, excluding an upper edge 181, of the battery cover 180 are formed as side walls 182 and a lower wall 183, respectively. An operating portion 184, which indicates a direction along which the battery cover 180 is removed from the stand containing groove portion 153 and which has been subjected to antislipping treatment, is formed on a front surface of the battery cover 180. An engagement piece 188 is formed on the upper edge 181, and engagement pieces 189a and 189b are formed on the lower wall 183.

A rib 186 for pressing a left side surface of the battery 190 is formed on a back surface 185 of the battery cover 180 in such a manner as to extent in parallel to the side walls 182, and ribs 187 for reinforcing the pressing rib 186 are formed.

The battery 190 is inserted in the battery containing groove portion 155 at a position offset to a left side, in a state that as shown in FIG. 3(A), the stand 170 has been opened and the battery cover 180 has been removed from the stand containing groove portion 153, and thereafter, the battery 190 is, as shown in FIG. 3(C), slid in a right direction indicated by the mark 191.

At this time, the rail 157 of the battery containing groove portion 155 is inserted in the guide groove 197 of the battery 190, and the connection terminals 156a and 156b located in the battery containing groove portion 155 are inserted in the holes 196a and 196b of the battery 190 and then connected to the connection terminals in the holes 196a and 196b, whereby the battery 190 is mounted in the battery containing groove portion 155 in a state in which the monitor unit 100 is ready for drive by the battery 190.

After the battery 190 is mounted in the battery containing groove portion 155, as shown in FIG. 4(A), the battery cover 180 is inserted in the stand containing groove portion 153 and is slid upwardly. At this time, the engagement piece 188 is engaged in the groove portion 158, and the engagement pieces 189a and 189b are engaged in the holes 159a and 159b respectively, so that as shown in FIGS. 2(A) and 2(B), the battery cover 180 is mounted in the stand containing groove portion 153.

In the state that the battery cover 180 is mounted in the stand containing groove portion 153, since the pressing rib 186 on the back surface 185 of the battery cover 180 presses a left side surface of the battery 190, the connection of the battery 190 to the connection terminals 156a and 156b can be kept; since the engagement piece 188 is engaged in the containing groove portion 158, the battery cover 180 can be prevented from being slipped downwardly; and since the engagement pieces 189a and 189b are engaged in the holes 159a and 159b respectively, the battery cover 180 can be prevented from being slipped on a rear side.

In the case of carrying the monitor unit 100, as shown in FIGS. 2(A) and 2(B), by containing the stand 170 in the stand containing groove portion 153, the slip-off of the battery cover 180 from the stand containing groove portion 153, and accordingly, the slip-off of the battery 190 from the battery containing groove portion 155 can be more certainly prevented.

In the case of taking the battery 190 out of the battery containing groove portion 155, as shown in FIG. 4(A), the battery cover 180 is slid downwardly while pushing the operating piece 184 in a state that the stand 170 is opened, to remove the engagement piece 188 from the groove portion 158 and also remove the engagement pieces 189a and 189b from the holes 159a and 159b; and thereafter, the battery cover 180 is pulled out on this side (on the front side of the paper plane), and the battery 190 mounted in the battery containing groove portion 155 as shown in FIG. 3(C) is slid on the left side as shown in FIG. 3(A) and pulled on this side (on the front side of the paper plane).

[Embodiment of Base Unit]

Figure 5A:
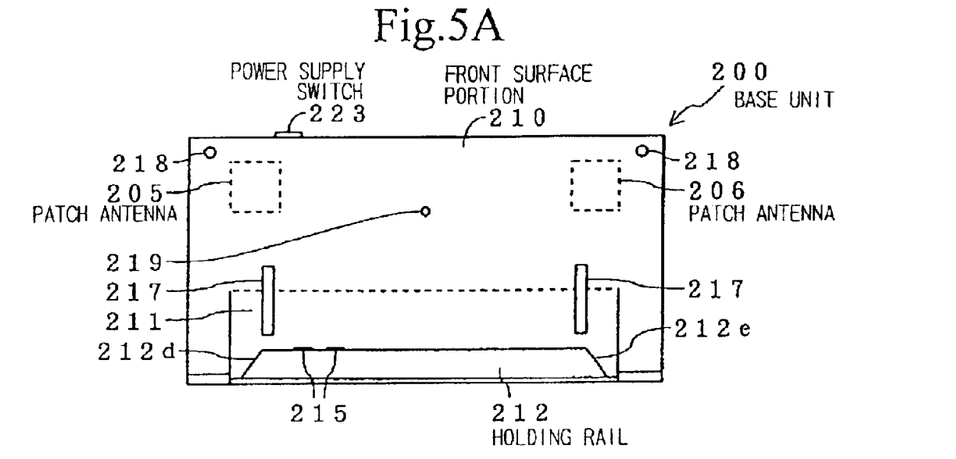
FIG. 5(A) is a front view of the base unit.
Figure 5B:
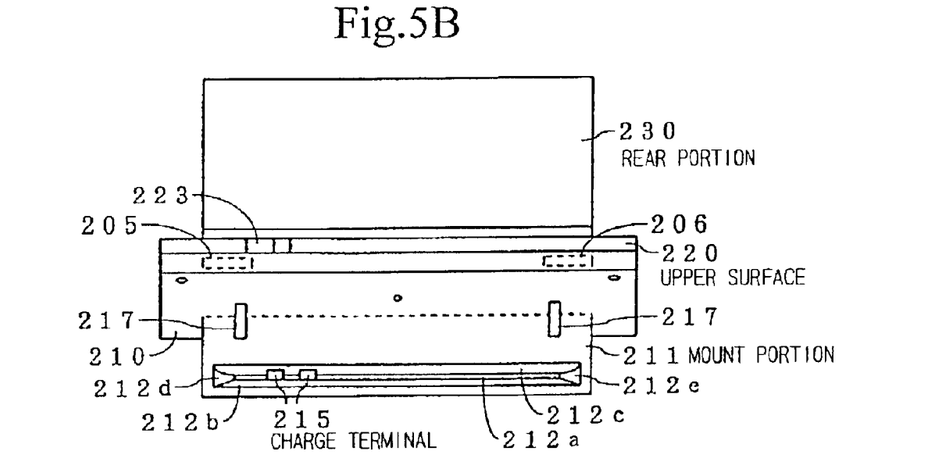
FIG. 5(B) is a top view of the base unit.
Figure 5C:
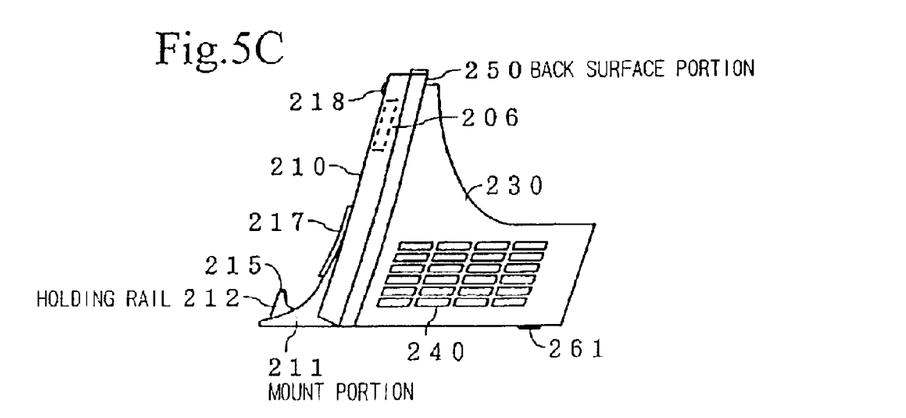
FIG. 5(C) is a right side view of the base unit.

As shown in FIGS. 5(A) to 5(C), the base unit 200 has an integral structure that a front surface portion 210 is stuck on a back surface portion 250 mounted on a rear portion 230. On an upper portion of the front surface portion 210 of the base unit 200, so-called patch antennas 205 and 206 are provided at left and right positions for radio communication between the monitor unit 100 and the base unit 200.

Like the patch antennas 105 and 106 of the monitor unit 100, one patch antenna 205 forms a hemispherical surface shaped radiation pattern on a front side of the front surface portion 210, and the other patch antenna 206 forms a hemispherical surface shaped radiation pattern on a rear side of the front surface portion 210. By selecting either of the patch antennas 205 and 206 for actually transmitting and receiving signals on the basis of reception level information of each of the patch antennas 205 and 206, the patch antennas 205 and 206 form an antenna having a full-spherical surface shaped radiation pattern as a whole, to thereby desirably perform radio communication between the monitor unit 100 and the base unit 200 irrespective of a positional relationship between the monitor unit 100 and the base unit 200.

The front surface portion 210 and the back surface portion 250 are somewhat tilted on a rear side. A mount portion 211 having a curved slope shape along a curved slope shape of the back surface portion 150 of the monitor unit 100 is formed on a lower portion of the front surface portion 210. A holding rail 212 to be inserted in the groove portion 161 of the bottom surface 160 of the monitor unit 100 when the monitor unit 100 is stood against the base unit 200 is formed on a lower portion of the mount portion 211.

The holding rail 212 has a front side surface 212b somewhat tilted on the rear side and also has a rear side surface 212c curvedly tilted on the front side. Left and right planes 212d and 212e of the holding rail 212 are tilted in such a manner that as positions of the left and right planes 212d and 212e come closer to a top surface 212a, a gap therebetween becomes narrower. A pair of charge terminals 215 are provided in such a manner as to extend from the top surface 212a to the rear surface 212c of the holding rail 212.

On the front surface portion 210 of the base unit 200, two shock absorbers 217 and shock absorbers 218, which are made from rubber or the like for absorbing shock occurring when the monitor unit 100 is stood against the base unit 200, are mounted at left and right positions crossing the mount portion 211 and left and right positions on an upper side, respectively, and a lamp (LED) 219, which lights up at the time of input of a power supply and flashes at the time of circuit-connection, is provided at a central portion.

A power supply switch 223 is provided on an upper surface 220 of the back surface portion 250, vent holes 240 are provided in both side surfaces of the rear portion 230, and an antislipping body 261 made from rubber or the like is mounted on a bottom surface of the rear portion 230. The front surface portion 210 is joined to the back surface portion 250 by means of screws 251 as shown in FIG. 6.

While not shown in FIGS. 5(A) to 5(C) and FIG. 6, a tuner and a modem, similar to those shown in FIG. 8, are provided in the rear portion 230. While not shown in FIGS. 5(A) to 5(C) and FIG. 6, a charge circuit connected to the charge terminal 215 is provided in the base unit 200.

Figure 6:
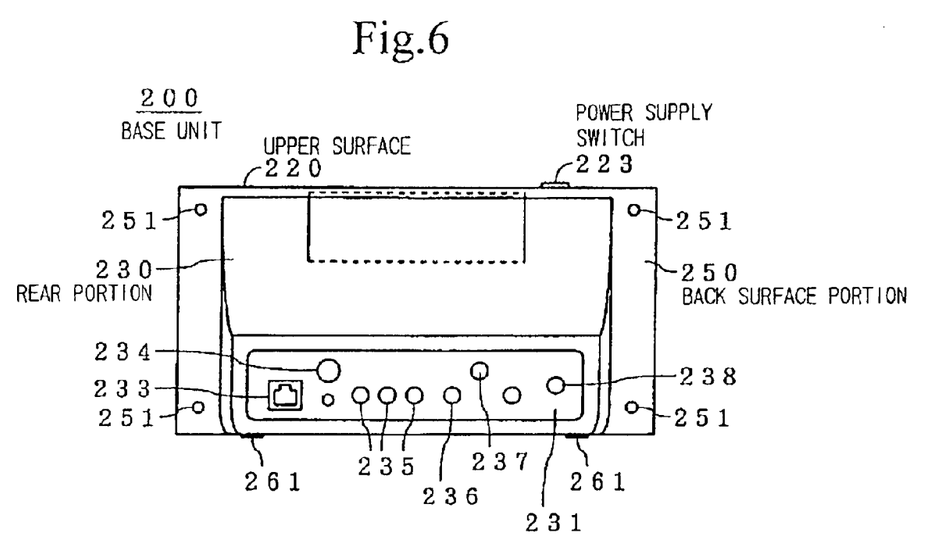
FIG. 6 is a back surface view of the base unit (Note: in these figures, the left side surface is symmetric to the right side surface, and therefore, the depiction of the left side view is omitted)

As shown in FIG. 6, a groove portion 231 is formed in a back surface of the rear portion 230. In the groove portion 231, various terminals are provided: a terminal 233 connected to a telephone line, a terminal 234 connected to a VHF/UHF antenna, a terminal 235 to which video signals (image and audio signals) are to be inputted from an external apparatus, a terminal 236 connected to an AV mouse, an earth terminal 237, and a terminal 238 connected to an AC power adapter for the base unit 200.

[Operational Configuration of System]

According to the above-described monitor unit 100 and base unit 200, a user can fixedly dispose the base unit 200 at a location in a living room or the like and carry the monitor unit 100 at an arbitrary location in a house or a garden, and at the arbitrary location, the user can achieve functions of, for example, receiving television broadcasting, and accessing the Internet to transmit and receive e-mails, by means of the monitor unit 100 located within reach.

Figure 7A:
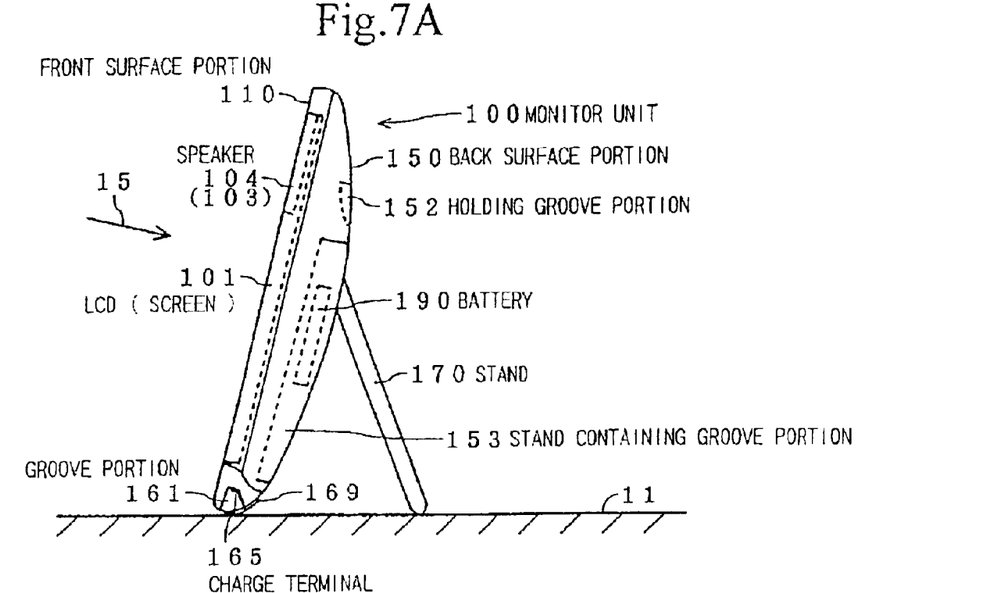
FIG. 7(A) is a side view showing a state in which the monitor unit is made to self-stand with the aid of a stand.

In this case, the user can use the monitor unit 100 while holding it with a hand, and further, as shown in FIG. 7(A) the user can pull the stand 170 out of the stand containing groove portion 153 and make the monitor unit 100 self-stand on a suitable plane 11 at a suitable tilt angle by means of the bottom surface of the monitor unit 100 and the stand 170, whereby the user can view a screen 101 in a direction shown by an arrow 15.

Figure 7B:
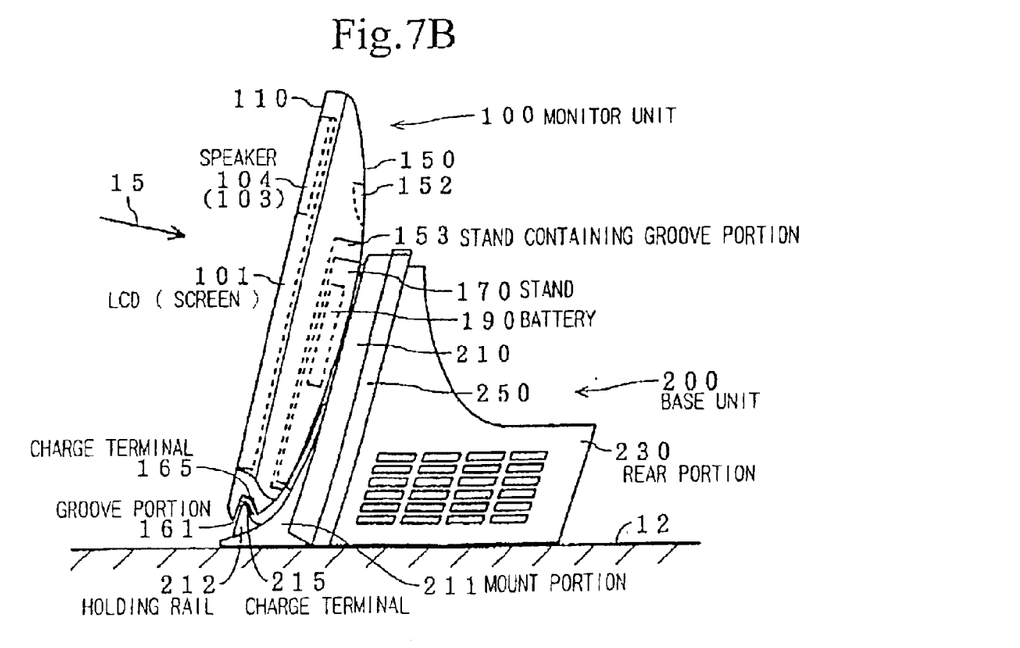
FIG. 7(B) is a side view showing a state in which the monitor unit is stood against the base unit.

At the time of charging the battery 190 mounted in the monitor unit 100, as shown in FIG. 7(B), the stand 170 is contained in the stand containing groove portion 153, and the monitor unit 100 is stood against the front surface portion 210 of the base unit 200 placed on a plane 12 in such a manner that the holding rail 212 of the base unit 200 is inserted in the groove portion 161 of the monitor unit 100.

In this case, as shown in FIGS. 2(A) and 2(B), since the left and right planes 162d and 162e of the groove portion 161 are tilted, and as shown in FIGS. 5(A) to 5(C), the left and right planes 212d and 212e of the holding rail 212 are tilted, the holding rail 212 of the base unit 200 can be easily inserted in the groove portion 161 of the monitor unit 100

In the state that the holding rail 212 of the base unit 200 is inserted in the groove portion 161 of the monitor unit 100, the charge terminal 215 on the base unit 200 side is brought into contact with the charge terminal 165 on the monitor unit 100 side at a sufficiently large contact pressure (Note: in FIG. 7(B), for the sake of convenience, to distinguish the charge terminals 215 and 165 from each other, they are depicted as a gap is present therebetween), the battery 190 mounted in the monitor unit 100 can be charged by the charge circuit of the base unit 200.

Further, at this time, the front surface side of the monitor unit 100 is not covered with the base unit 200 at all, and consequently, even at the time of charging, a user can use the monitor unit 100, and more concretely, the user can view a screen 101, just like the monitor unit 100 at the time of non-charging.

Even when the battery 190 is not charged, the monitor unit 100 can be used in the state being stood against the base unit 200.

[Another Embodiment]

The monitor unit used together with the base unit may be configured such that a battery be mounted not in a back surface portion but in another portion insofar the monitor unit have a display on a front surface portion and be driven by the battery.

In the above-described embodiment, the information terminal unit of the present invention is configured as a monitor unit of a system composed of the monitor unit and a base unit; however, the information terminal unit of the present invention may be configured as any information terminal unit other than the above-described monitor unit of the system composed of the monitor unit and the base unit insofar the information terminal unit have a display on a front surface portion and be driven by the battery and also the battery be mounted in a back surface of the information terminal unit.

What is claimed is:

1. A monitor unit, in which a display is provided on a front surface portion and a battery is mounted in a back surface portion or another portion, characterized in that a groove portion, in which a holding rail provided on a bottom portion of a front surface portion of a base unit for transmitting image information to said monitor unit is to be inserted, is formed in a bottom surface of said monitor unit;

a charge terminal to be connected to a charge terminal provided on said holding rail of said base unit is provided in said groove portion of said monitor unit, and wherein a plurality of antennas each of which forms a hemispherical surface shaped radiation pattern, are disposed in such a manner that back surface sides of the radiation patterns of said plurality of antennas are opposed to each other.

2. A monitor unit according to claim 1, wherein planes, located at both ends in a direction equivalent to a lateral direction of a screen of said display, of said groove portion are tilted.

3. A monitor unit according to claim 1, wherein a stand for allowing said monitor unit to self-stand is provided on said back surface portion of said monitor unit.

4. A monitor unit according to claim 1, wherein either of said plurality of antennas is selected on the basis of reception level information of said plurality of antennas, to thereby form an antenna having a full-spherical surface shaped radiation pattern as a whole.

5. A base unit for transmitting image information to a monitor unit, said monitor unit including a display provided on a front surface portion and a battery mounted on a back surface portion or another portion, characterized in that a holding rail to be inserted in a groove portion formed in a bottom surface of said monitor unit is provided on a bottom portion of a front surface portion of said base unit;

a charge terminal to be connected to a charge terminal provided in said groove portion of said monitor unit is provided on said holding rail, and wherein a plurality of antennas, each of which forms a hemispherical surface shaped radiation pattern, are disposed in such a manner that back surface sides of the radiation patterns of said plurality of antennas are opposed to each other.

6. A base unit according to claim 5, wherein planes, located at both ends in a direction equivalent to a lateral direction of a screen of said display of said monitor unit, of said holding rail are tilted.

7. A base unit according to claim 5, wherein said front surface portion of said base unit is tilted on a rear side.

8. A base unit according to claim 5, wherein either of said plurality of antennas is selected on the basis of reception level information of said plurality of antennas, to thereby form an antenna having a full-spherical surface shaped radiation pattern as a whole.

9. A radio communication system characterized by including:

a monitor unit including a display provided on a front surface portion and a battery mounted on a back surface portion or another portion, wherein a groove portion in which a holding rail provided on a bottom portion of a front surface portion of a base unit for transmitting image information to said monitor unit is formed in a bottom surface of said monitor unit and a charge terminal to be connected to a charge terminal provided on the holding rail of the base unit is provided in said groove portion;

a base unit for transmitting image information to said monitor unit, wherein a holding rail to be inserted in said groove portion of said monitor unit is provided on a bottom portion of a front surface portion of said base unit, and a charge terminal to be connected to said charge terminal provided in said groove portion of said monitor unit, and wherein a plurality of antennas, each of which forms a hemispherical surface shaped radiation pattern are disposed in such a manner that back surface sides of the radiation patterns of said plurality of antennas are opposed to each other.

10. An information terminal unit including a display on a front surface portion and being driven by a battery, characterized in that a battery containing groove portion is formed in a back surface portion and a battery mounting portion is provided on one end side of said battery containing groove portion;

a battery cover is provided so as to be mounted in said battery containing groove portion in a state in which a battery has been inserted in said battery containing groove portion from a rear side of said back surface portion, being slid in said battery containing groove portion in a direction parallel to a screen of said display, and mounted in said battery mounting portion;

a rib for pressing said battery on said battery mounting portion side is formed on a back surface of said battery cover, and wherein a plurality of antennas, each of which forms a hemispherical surface shaped radiation pattern are disposed in such a manner that back surface sides of the radiation patterns of said plurality of antennas are opposed to each other.

11. An information terminal unit according to claim 10, wherein said one end is one end in a lateral direction of a screen of said display.

12. An information terminal unit according to claim 10, wherein a stand containing groove portion is formed around said battery containing groove portion of said back surface portion, and a stand for allowing said information terminal unit to self-stand is contained in said stand containing groove portion.

* * * * *